Figure 1:
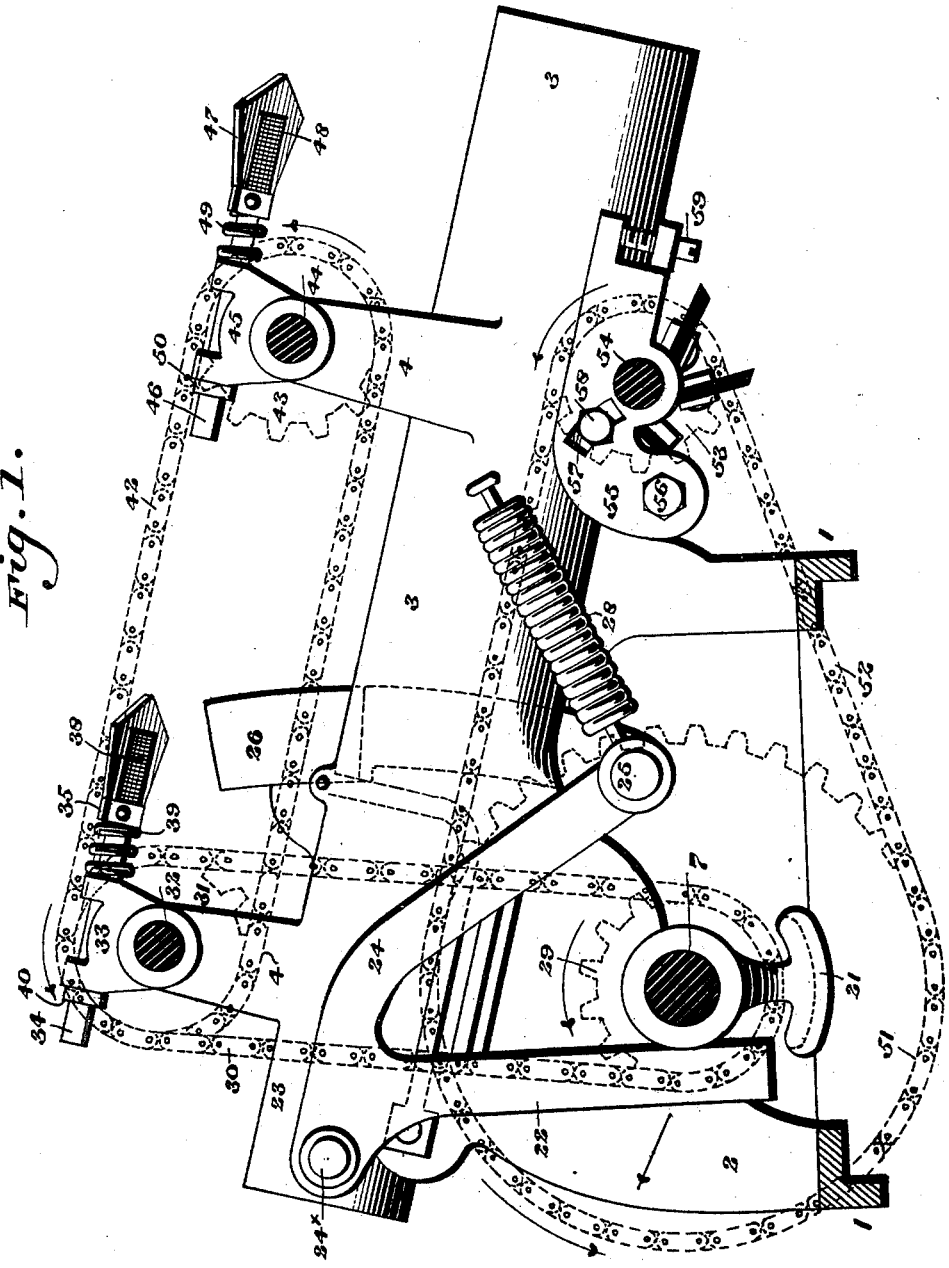

(No Model.)  5 Sheets—Sheet 1.

G. W. STEVENSON.
MACHINE FOR CLEANING FISH.

No. 592,500. Patented Oct. 26, 1897.

WITNESSES
P. F. Nagle
L. Douville

INVENTOR.
George W. Stevenson
BY Wiedersheim + Fairbanks
ATTORNEYS (No Model.) 5 Sheets—Sheet 2.
G. W. STEVENSON.
MACHINE FOR CLEANING FISH.
No. 592,500. Patented Oct. 26, 1897.
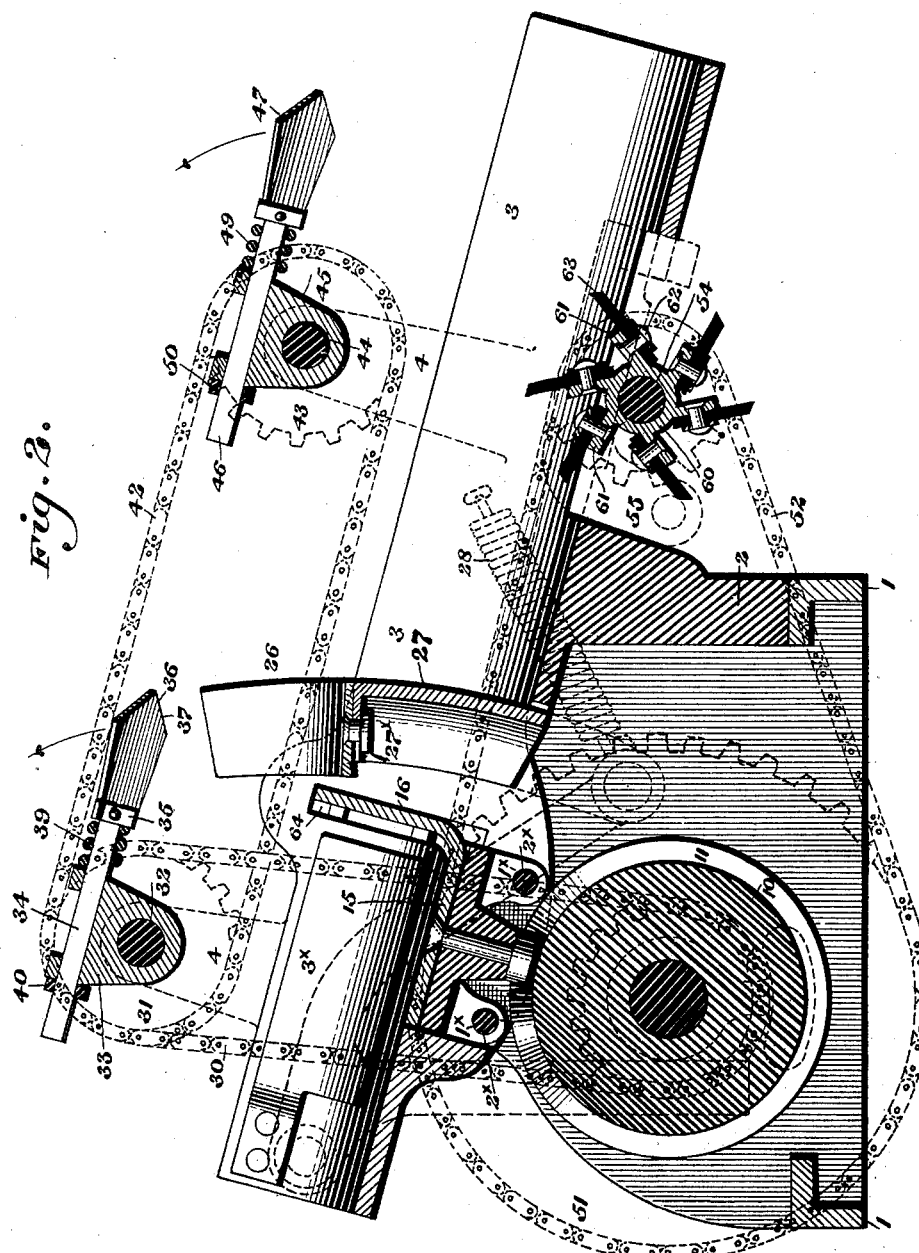
WITNESSES
P. H. Cagley.
L. Douville.
INVENTOR.
George W. Stevenson.
BY
Wiederheim + Fairbanks
ATTORNEYS (No Model.) 5 Sheets—Sheet 3.
G. W. STEVENSON.
MACHINE FOR CLEANING FISH.
No. 592,500. Patented Oct. 26, 1897.
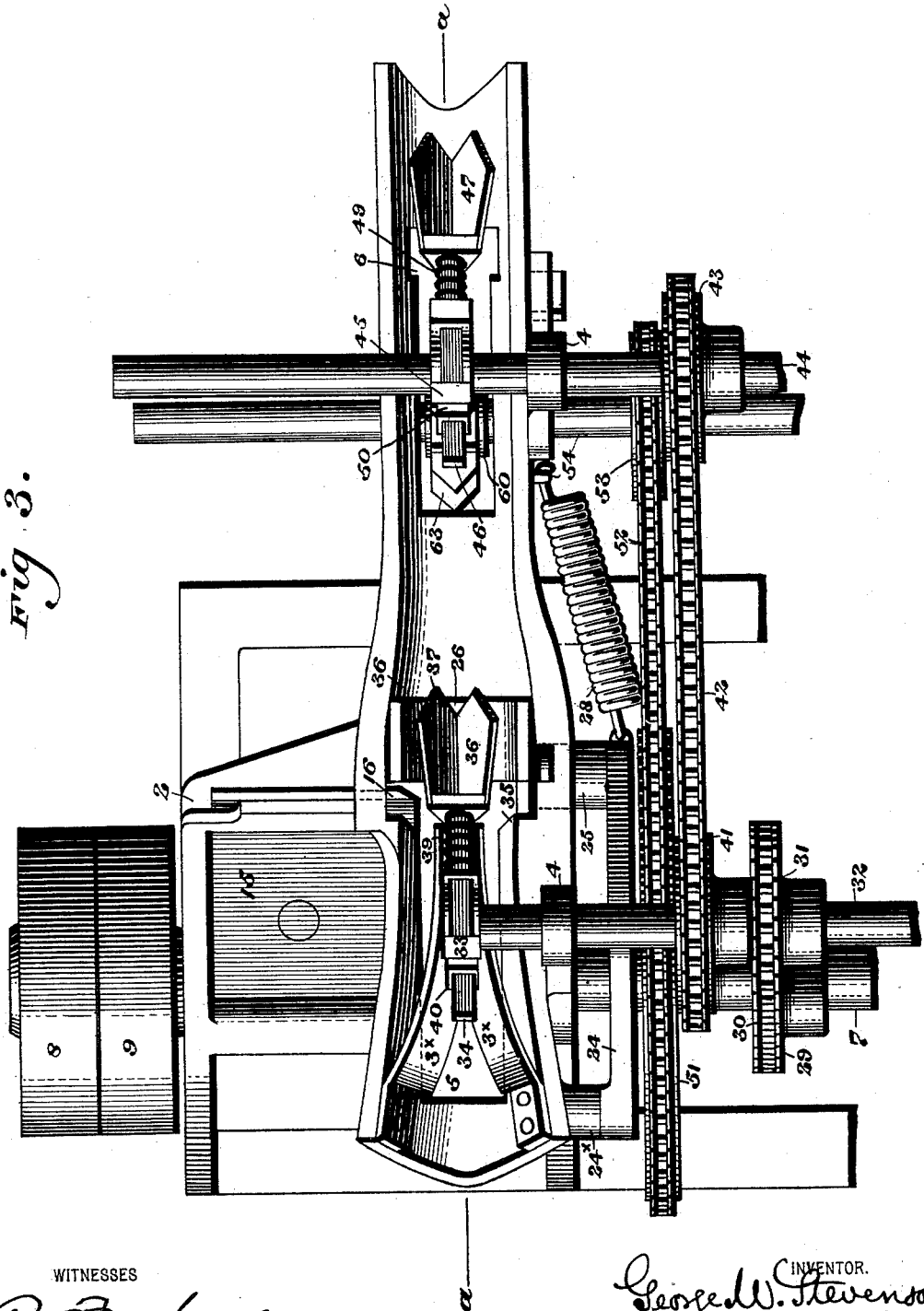

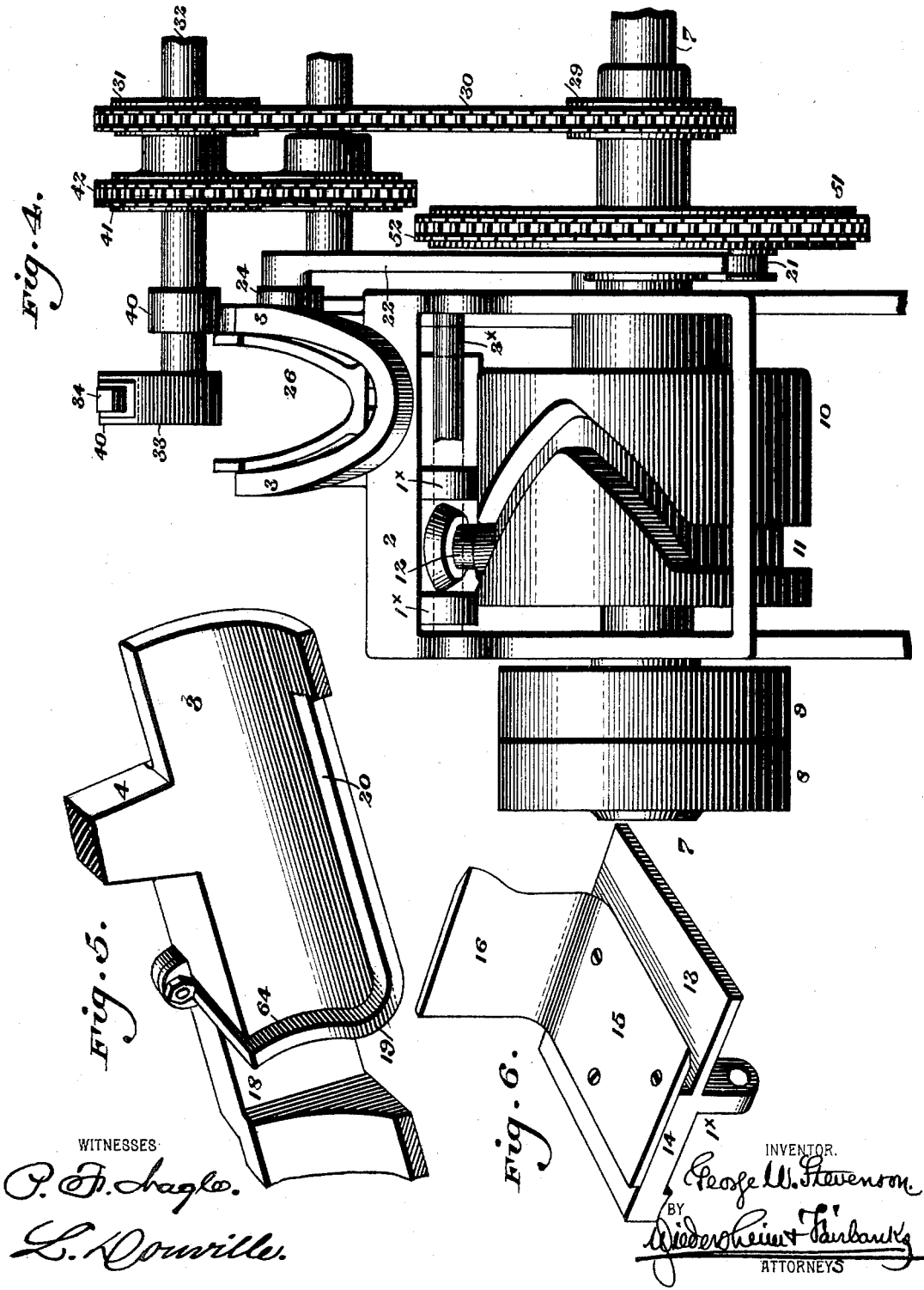

(No Model.) 5 Sheets—Sheet 5.
G. W. STEVENSON.
MACHINE FOR CLEANING FISH.
No. 592,500. Patented Oct. 26, 1897.
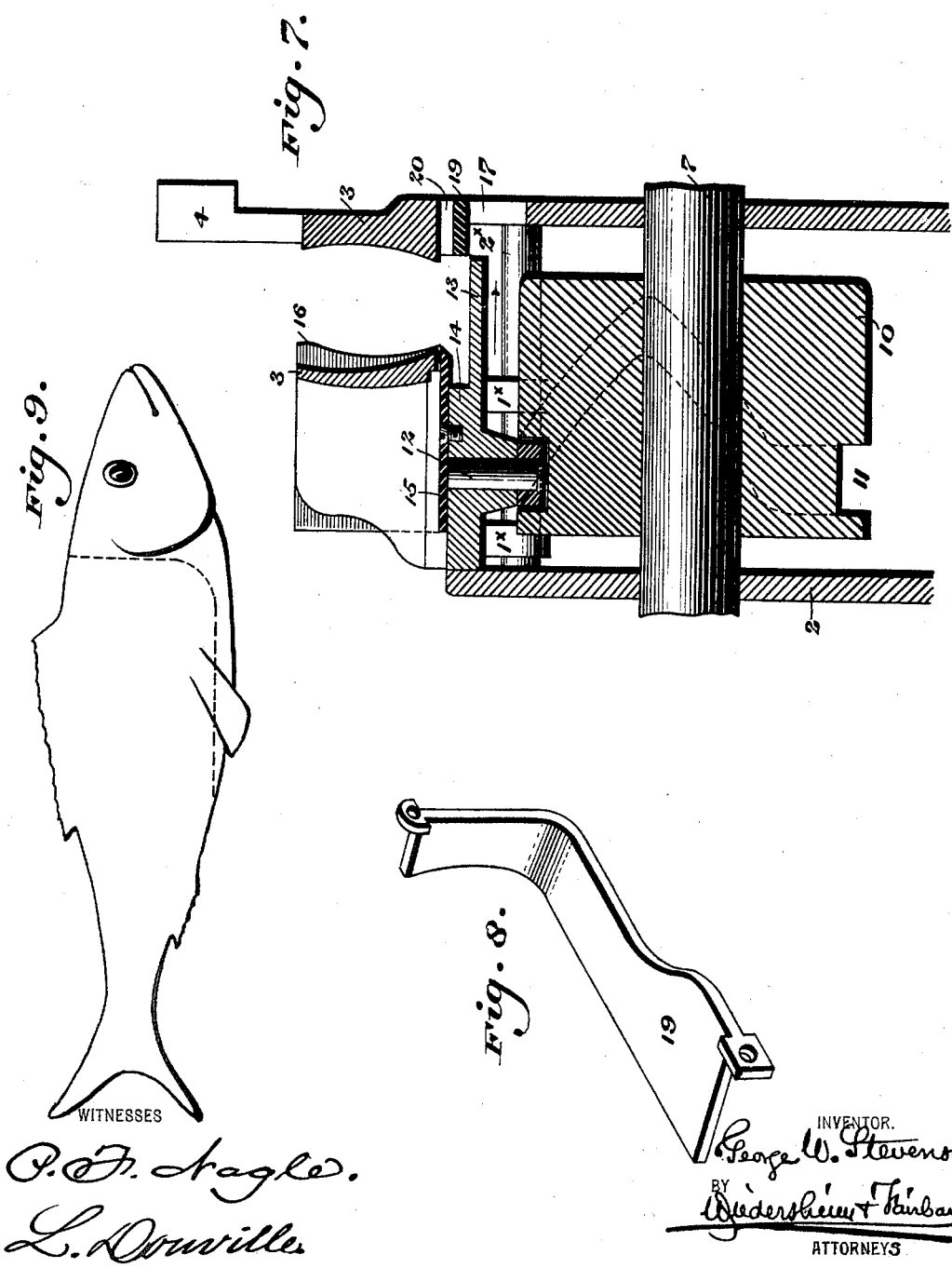

UNITED STATES PATENT OFFICE.

GEORGE W. STEVENSON, OF CRAMER'S HILL, NEW JERSEY, ASSIGNOR OF ONE-HALF TO THEODORE LEAS, OF CAMDEN, NEW JERSEY.

MACHINE FOR CLEANING FISH.

SPECIFICATION forming part of Letters Patent No. 592,500, dated October 26, 1897.

Application filed June 25, 1897. Serial No. 642,233. (No model.)

*To all whom it may concern:*

Be it known that I, GEORGE W. STEVENSON, a citizen of the United States, residing at Cramer's Hill, in the county of Camden, State of New Jersey, have invented a new and useful Improvement in a Machine for Cleaning, Cutting, and Gutting Fish, which improvement is fully set forth in the following specification and accompanying drawings.

My invention consists of a machine for cleaning, cutting, and gutting fish wherein the various and successive steps which have heretofore been performed by hand are performed mechanically and automatically.

It further consists of novel details of construction, all as will be hereinafter fully set forth.

Figure 1 represents a side elevation of a machine embodying my invention. Fig. 2 represents a vertical longitudinal sectional view thereof on line $a\ a$, Fig. 3. Fig. 3 represents a plan view thereof. Fig. 4 represents an end view thereof. Figs. 5, 6, and 8 represent perspective views of detailed portions of the machine on an enlarged scale. Fig. 7 represents a vertical section of a cutting device employed, shown detached. Fig. 9 represents an elevation of a fish, showing in dotted lines the shape of the cut formed by the machine.

Similar numerals of reference indicate corresponding parts in the figures.

Referring to the drawings, 1 designates the frame or support for the machine, on which is suitably secured the head 2. Attached thereto or forming part thereof is a guide or trough 3, the same being provided with standards 4 and having in the bottom thereof the openings 5 and 6. Journaled in the head 2 of the machine is a shaft 7, which carries the pulleys 8 and 9, to which power is applied. Movably attached to said shaft 7 is a cam 10, in which is the slot 11, in which is adapted to move a stud 12, the latter being attached to or forming part of a table 13, which has a raised portion 14 and which carries the knife 15, the latter being provided with an upright portion 16, said table being provided with lugs $1^{\times}$, which are movably mounted on bars $2^{\times}$, carried in the head 2, and upon which said table is adapted to move in the direction indicated by the arrow, Fig. 7, said head 2 having an opening 17 through which a portion of said table 13 is adapted to pass when the knife has performed the cutting.

The trough or guide 3 is cut away at 13 and has secured thereto a plate 19, which is so situated as to leave spaces 20 and 64 between it and the said trough, in which spaces the knife 15 and upright portion 16 are adapted to enter.

21 designates a cam which is mounted on the shaft 7 and is adapted to contact with the arm 22 of the elbow-lever 23, which is pivoted at $24^{\times}$ to the trough 3, the other arm 24 of said elbow-lever having pivoted thereto at 25 the transferrer 26, which passes up through the opening 5 in the trough 3, and has the nose piece or stop 27 adjustably attached thereto by means of the pin $27^{\times}$, said nose-piece fitting in said trough 3, so as to act as a stop for the fish after it has been placed in said trough, said nose-piece being adapted to be adjusted in said trough, depending upon the size of the fish by loosening the pin $27^{\times}$ and moving the said nose-piece to the desired point, after which the said pin can again be tightened. A spring 28 has one end secured to said arm 24 of the elbow-lever 23, the other end being attached to the trough 3 or to any other suitable portion of the head 2, and is adapted to return the elbow-lever to its normal position. If desired, other means may be employed for returning the lever.

Mounted on the shaft 7 is a gear or sprocket 29, around which passes a chain 30, which also passes around the gear or sprocket 31, which is mounted or carried by the shaft 32, the latter being supported in the standards 4 on the trough 3 and has secured thereto the ears 33, in which is movably mounted the arm 34, the same having secured thereto by the collar 35 the fingers 36, which are formed of rubber or other elastic or resilient material and which are substantially V-shaped, having the cut-away portion 37, said fingers having bearing thereagainst the springs 38, which are secured to the collar 35 and are adapted to hold the fingers normally in position, as seen in Fig. 1. On said arm 34 is a coiled spring 39, which bears against said ear 33 and said collar 35. A nut 40 at or near the opposite end of said arm 34 holds the same in place and allows adjustment thereof, this arrangement permitting a certain play in the parts as is required. On said shaft 32 is a second sprocket 41, around which passes the chain 42, which meshes with a sprocket 43, which is carried by the shaft 44, the latter having secured thereto a lug 45, which carries an arm 46, which carries a finger 47 similar to 38 and has a spring 48 bearing thereagainst and is further provided with a coil-spring 49, the operation being the same as in the previously-described arm 34.

51 designates a sprocket which is mounted on the shaft 7, around which passes the chain 52, the same meshing with the sprocket 53, which is carried by the shaft 54, said shaft having a bearing in the plate 55, which is pivotally attached at 56 to the head 2 of the machine and is provided with a slot 57, through which passes a headed pin 58, the same being adapted to lock said plate to the trough 3, and, if necessary, a screw 59 may be employed as an additional fastening device. Carried on said shaft 54 is a collar 60, which is provided with lugs 61, to which are adjustably secured by the bolts 62 the fingers 63, which are likewise formed of rubber or other elastic material and which are adapted to pass up through the opening 6 in the trough 3.

$3^\times$ designates spring-arms which are immovably attached to the side of the trough 3 and extend partially over the opening 5 in the bottom thereof, and upon said spring-arms the fish is adapted to rest when it is first placed in the trough.

The operation is as follows: The parts are in the position as seen in Fig. 1, and the fish is placed in the upper end of the trough or guide 3 and its head or nose bearing against the nose-piece 27 of the transferrer 26, which, it will be noted, is in the path thereof. The machine is now started and power is applied to the shaft 7, this causing the block 10 to revolve therewith and causing the stud 12 to move in the slot 11, which gives a reciprocating rectilinear motion thereto and carries with said stud the table 13, which moves in the direction indicated by the arrow, Fig. 7, and with it the knife 15 and upright portion 16, which latter cuts off the head of the fish and the portion 15 of the knife removes the lower portion or belly of the fish. The table 13 passes through the opening 17 and the knife edge 15 through the opening 20, while the upright portion 16 of the knife enters the space 64, as seen in Fig. 5. The table is now carried back by the stud moving in the slot 11 and with it the knife, so that the same will be removed after the cutting and be ready for the next operation. Meanwhile the cam 21, which is on the shaft 7, is turned in the direction indicated by the arrow in Fig. 1 and contacts with the arm 22 of the elbow-lever 23 and causes the arm 22 to move in the direction indicated by the arrow in Fig. 1, which also moves the arm 24 and carries with it the transferrer 26, the pin $27^\times$ of which strikes the severed head of the fish and carries the same, together with the other portion of the fish which has been cut away, through the opening 5, where said portion falls into a proper receptacle, said transferrer 26 continuing its downward movement to a point that the same will be out of the path of the fish or on a level with the bottom of the trough 3, thus making the walls and the bottom thereof continuous and preventing the fish from being displaced. The chain 30, which passes around the sprocket 29, has been operated and gives motion to the shaft 32, which causes the ear 33 and its component parts to be carried in the direction indicated by the arrow in Fig. 2. The finger 36 engages with the fish at a point about the rear of the top fin and forces the same down the trough past the transferrer 26, where it is engaged by the finger 47, which has been operated by reason of the chain 42 giving motion to the shaft 44, upon which the lug 45, which carries the said finger 47, is mounted. Said finger 47 carries the fish onward until it reaches the fingers 63, which have been caused to revolve by reason of the movement of the chain 52, which passes around the sprocket 51 on the shaft 7 and passes around the sprocket 53, which is secured to the shaft 54, upon which the collar 60 is mounted, which carries said fingers, and as the fish has been opened said fingers will enter the same and remove the entrails, which will fall through the opening 6 in the trough 3 and be directed into a proper receptacle, the fish being carried past the opening 6, and may be removed from the trough 3 after having been cleaned, &c., and is ready for pickling or other purposes. It will be noted that as the fingers 36 are of rubber or other suitable material the same will bend, and when contacting with the fish the same will give slightly, so as to engage the body thereof securely, and if the pressure should be too great the spring-arms $3^\times$ will give to a certain extent, thus preventing breakage or tearing of the fish, while the said arms will hold the fish upright, allowing, however, the same to be passed along by said fingers. As soon as the cam 21 has passed the arm 22 the spring 28 returns the arm 24 to its normal position, which carries with it the transferrer 26, the shafts 32 and 44 meanwhile revolving and carrying with them the arms 34 and 46, so that the same will be ready for the next operation, which can now be repeated, new fish being placed in the trough as required.

Particular attention is called to the shape of the trough 3, which is practically that of a fish, so that the same will always be held upright to prevent any turning and to assure the proper cutting of the same.

In the drawings I have shown a single set of parts, but it will of course be evident that the parts may be multiplied as many times as desired, the operation being the same in each case, since by simply extending the various shafts motion may be imparted to mechanism similar to that shown, and thus a single machine may have as many guides and necessary parts as desired, depending upon the amount of work that is to be done.

It will of course be evident that various changes may be made without departing from my invention, and I therefore do not desire to be limited to the exact construction I have herein shown and described, but may make such changes as will come within the scope of my invention.

Having thus described my invention, what I claim as new, and desire to secure by Letters Patent, is—

1. In a machine of the character named, a receptacle for a fish, a knife automatically operated to cut the same, a transferrer in said receptacle, which is adapted to remove the cut-away portions of the fish and means which are suitably operated to remove the entrails of said fish.

2. In a machine of the character named, a receptacle for a fish, a knife suitably operated for cutting the same, a transferrer in said guide for removing the cut-away portions of the fish, mechanism suitably operated for removing the entrails thereof and means for removing the fish from the knife to said latter-mentioned mechanism.

3. In a machine of the character named, a guide adapted to receive a fish, a knife automatically operated to cut the same, a transferrer in said guide which is adapted to remove the cut-away portions of the fish, a nose-piece or stop adjustably secured to said transferrer, mechanism suitably operated for removing the entrails of said fish and mechanism for removing the fish from the knife to said finger.

4. In a machine of the character named, a guide adapted to receive a fish, a knife automatically operated to cut the same, a transferrer in said guide which is adapted to act as a stop and to remove the cut-away portions of the fish, and fingers which are suitably operated to remove the entrails of said fish.

5. In a machine of the character named, a guide adapted to receive a fish, a knife suitably operated for cutting the same, a transferrer in said guide which is adapted to remove the cut-away portions of the fish, fingers suitably operated for removing the entrails thereof, and mechanism for moving the fish from the knife to said fingers.

6. In a machine of the character named, a table, means for operating the same, a knife mounted on said table, a guide adapted to receive the fish, said knife being adapted to enter said guide, means for holding said fish during the cutting, fingers suitably operated to remove the entrails of said fish, and arms having fingers thereon which are adapted to transfer the fish in said guide.

7. In a machine of the character named, a guide adapted to receive a fish, a power-shaft, a cam thereon, a table adapted to be operated by said cam, a knife carried by said table and means for holding said fish during the operation of cutting.

8. In a machine of the character named, a guide adapted to receive a fish, a power-shaft, a cam thereon, a table adapted to be operated by said cam, a knife on said table, means for holding said fish during the operation of cutting, and a transferrer adapted to act as a stop and be operated to remove the cut-away portions of the fish.

9. In a machine of the character named, a guide for the fish, a power-shaft, a table, means on said shaft for imparting motion to said table, a knife carried by said table, means for holding the fish during the cutting, a second shaft, mechanism thereon for removing the entrails of the fish, and means for imparting motion from one shaft to the other.

10. In a machine of the character named, a guide adapted to receive a fish, a power-shaft, a table, a knife for said table, mechanism on said power-shaft for operating said table, a transferrer in said guide adapted to be operated by said power-shaft, arms having fingers thereon mounted on a second shaft, and means for imparting motion thereto.

11. In a machine of the character named, a guide adapted to receive a fish, mechanism for holding said fish therein, a power-shaft, a table, means on said power-shaft for operating the same, a knife on said table, a transferrer, an elbow-lever secured thereto, means on said power-shaft for operating said elbow-lever, arms having fingers adapted to be operated in order to move the fish, a second shaft and fingers mounted thereon adapted to remove the entrails of said fish.

12. In a machine of the character named, a guide adapted to receive a fish, said guide having openings in the bottom thereof, spring-arms secured to said guide adapted to hold said fish, a table carried on suitable bearings, a power-shaft, means on said power-shaft for operating said table, a transferrer movable in said guide, means on said power-shaft for operating said transferrer, arms having fingers carried by suitable shafts, means for imparting motion to said shafts, and fingers carried by a shaft which are adapted to remove the entrails of the fish.

13. In a machine of the character named, a guide having openings in the bottom thereof, a power-shaft, a cam on said power-shaft, a table suitably mounted, provided with a stud which is adapted to move in a groove in said cam, a knife on said table which is adapted to operate in one of said openings in said guide, spring-arms extending partially over one of said openings, a transferrer moving in one of said openings and an elbow-lever suitably mounted, to which said transferrer is pivotally connected, means for returning said elbow-lever to its normal position, arms suitably mounted adapted to operate in order to remove fish from said guide, a shaft having fingers suitably mounted thereon adapted to operate in the other opening in said guide, and means for imparting motion to the last-mentioned shaft.

14. In a machine of the character named, a guide having openings therein, a power-shaft, a cam carried by said power-shaft, a table suitably supported and adapted to be operated by said cam, a knife carried by said table, an elbow-lever suitably supported and adapted to be operated by said power-shaft, means for returning said elbow-lever to its normal position, and a transferrer moving in an opening in said guide and pivotally attached to said elbow-lever, a shaft carrying an arm, means for imparting motion thereto, and fingers which are adapted to operate in an opening in said guide, said fingers being mounted on a shaft to which motion is imparted from said power-shaft.

15. In a machine of the character named, a guide adapted to receive a fish, a knife automatically operated to cut the same, a transferrer in said guide, which is adapted to remove the cut-away portions of the fish and elastic fingers adjustably mounted which are suitably operated to remove the entrails of said fish.

16. In a machine of the character named, a guide adapted to receive a fish, a knife suitably operated for cutting the same, a transferrer in said guide, which is adapted to remove the cut-away portions of the fish, fingers suitably operated for removing the entrails thereof, elastic fingers suitably mounted on the arm which is operated and moves the fish from the knife to said fingers and springs mounted on said arm.

GEORGE W. STEVENSON.

Witnesses:
JOHN A. WIEDERSHEIM,
A. P. JENNINGS.